(12) United States Patent
Funatsu et al.

(10) Patent No.: US 6,629,893 B1
(45) Date of Patent: Oct. 7, 2003

(54) GAME SYSTEM AND INFORMATION STORAGE MEDIUM

(75) Inventors: Tetsuya Funatsu, Tokyo (JP); Toshio Natsui, Tokyo (JP); Michio Yamada, Tokyo (JP)

(73) Assignee: Namco Ltd., Tokyo (JP)

(*) Notice: Subject to any disclaimer, the term of this patent is extended or adjusted under 35 U.S.C. 154(b) by 0 days.

(21) Appl. No.: 09/463,168

(22) PCT Filed: May 21, 1999

(86) PCT No.: PCT/JP99/02682
§ 371 (c)(1),
(2), (4) Date: Apr. 5, 2000

(87) PCT Pub. No.: WO99/61122
PCT Pub. Date: Dec. 2, 1999

(30) Foreign Application Priority Data

May 22, 1998 (JP) .......................................... 10-158480

(51) Int. Cl.⁷ ................................................ A63F 13/00
(52) U.S. Cl. .......................................... 463/43; 463/30
(58) Field of Search ........................ 463/1–8, 23, 25, 463/29–32, 35–38, 40–44, 59; 273/459, 460, 461

(56) References Cited

U.S. PATENT DOCUMENTS

| | | | | |
|---|---|---|---|---|
| 5,083,271 A | * | 1/1992 | Thatcher et al. | 700/92 |
| 5,720,663 A | * | 2/1998 | Nakatani et al. | 463/23 |
| 6,354,939 B1 | * | 3/2002 | Morita et al. | 463/1 |

FOREIGN PATENT DOCUMENTS

| | | |
|---|---|---|
| JP | A-61-76182 | 4/1986 |
| JP | A-6-86869 | 3/1994 |
| JP | A-7-148352 | 6/1995 |
| JP | A-8-206357 | 8/1996 |
| JP | A-9-225142 | 9/1997 |

* cited by examiner

Primary Examiner—Kim Nguyen
(74) Attorney, Agent, or Firm—Oliff & Berridge, PLC

(57) ABSTRACT

This invention provides a game system that reflects the allegiances of a player towards an object that is manipulated in the game. In the game system, any manipulation object can be selected from a plurality of manipulation objects. The game system has a computing device for computing selection assessments for each manipulation object, and a displaying device for displaying the selection assessments for each manipulation object on a display section, when the player selects a manipulation object.

19 Claims, 9 Drawing Sheets

GAME SYSTEM AND INFORMATION STORAGE MEDIUM

TECHNICAL FIELD

This invention relates to a game system and an information storage medium.

BACKGROUND ART

Game machines that are known in the art permit the selection of a manipulation object to play a game therewith. Examples of these are game machines that present a game such as baseball or soccer.

The description below concerns a game machine that presents a baseball game, by way of example. In a prior-art game machine, data on a plurality of teams is previously stored When a player inserts a coin, a team selection screen is displayed. The player selects a personal favorite from the plurality of teams displayed, and plays the game.

In a system that presents a baseball game, for example, 12 professional baseball teams are displayed as manipulation objects that can be selected. The player selects the team that the player likes, from these 12 baseball teams, to play the game.

With competitive games between teams that are sponsored in different regions, the popularity of each team often varies with the regions in which the game machines are installed. In addition, game machines installed in cities with large populations of people from other areas, such as Tokyo or New York, it often happens that the favored teams vary according to the places of origin of the players.

Moreover, if it were possible for players to know selection rates when selecting teams, as a barometer of how popular each team is, that would often increase the degree of satisfaction of the players with respect to the game. Assume, by way of example, that game machines are installed in Hiroshima and Los Angeles. If it were possible to display to each player the selection rate of local teams sponsored within these regions, together with the selection rate of other teams, when it comes to selecting teams, each player can enjoy the game while being satisfied that the player's own favorite team is highly popular. Unfortunately, it has not been possible in the art to produce a game that reflects the players' own interests in the manipulation objects, when such objects are selected.

In a known prior-art game machine, the abilities of baseball teams or other manipulation objects that can be selected are fixed therein when the game machine is shipped.

Thus the abilities of the teams or characters that are the manipulation objects are always the same, no matter which game machine is used for playing the game. This raises a problem in that it is difficult to increase the player's feeling of participation in the game and thus make the game more interesting.

Particularly with a game in which the selection and game-play relates to manipulation objects that are closely linked to regions, the allegiances of players towards the teams or characters that are the manipulation objects vary widely between regions. For example, in St. Louis, the allegiances to St. Louis baseball teams are high whereas in Los Angeles, the allegiances to Los Angeles baseball teams are high. If it were possible to vary the abilities of a favorite team in accordance with the way in which a player plays the game, this would provide a game that has more interesting contents.

However, no game has yet been provided in prior-art game machine to address this point.

DISCLOSURE OF THE INVENTION

This invention was devised in the light of the above described problems and has as an objective thereof the provision of a game system and information storage medium that reflects the allegiances of a player in the selection objects of the game.

(1) In order to solve the above described technical problems, there is provided a game system which permits selection of any manipulation object from a plurality of manipulation objects, to play a game therewith, the game system comprising:

assessment computation means for computing and storing previous selection assessments for each manipulation object; and selection processing means for displaying on a display means information indicating the plurality of selectable manipulation objects and information indicating selection assessments for each of the manipulation objects, and for executing processing for enabling a player to select any manipulation object.

An information storage medium in accordance with this aspect of the invention is an information storage medium which can be used by a computer and which comprises information (a program) for implementing (executing) the above described means. A program in accordance with this aspect of the invention is a program that can be used by a computer for implementing (executing) the above described means. A program in accordance with this aspect of the invention could also be embodied in carrier wave.

With this aspect of the invention, it is possible to confirm from the display of selection assessments which manipulation object is the most popular at that location, during the selection. When the selection rate of the manipulation object that is the player's own favorite object is high, this enables the player to play the game with a feeling of satisfaction.

Conversely, if the selection rate of the player's favorite manipulation object is low, this could give the play incentive to play the game repeatedly, to increase the selection rate of the team that is the player's own favorite.

In this manner, this aspect of the invention makes it possible to provide a game system, information storage medium, or program that can provide players with a game that reflects the players' allegiances with respect to selection objects.

In this case, it does not matter what the contents of the game are, provided that the game involves the appearance of selected manipulation objects, but it is preferably a competitive type of game in which a manipulation object fights against an opponent. A manipulation object is any type of manipulation object that is set for each type of game, such as a team or character. The information indicating selection assessments includes various selection details, such as selection rate or number of selections. The display of selection assessments is a direct display or indirect display of selection assessments, such as a direct display of selection rate and selection count either numerically or in a bar chart or pie-chart, for example, or an indirect display such that the manipulation object with the highest selection rate is displayed larger.

The display means preferably displays the selection assessments of the manipulation objects on the selection screen for specific manipulation objects in sequence of height of selection rate, or number of selections.

(2) This invention also relates to a game system in which a host machine and a plurality of game terminals are connected by communications lines, such that each of the game terminals selects a manipulation object from among a plurality of manipulation objects, to play a game therewith;

wherein each of the game terminals sends a first signal to the host machine during the selection of the manipulation object and sends information concerning the selected manipulation object as a second signal after the selection of the manipulation object;

wherein the host machine comprises:

means for computing and storing previous selection assessments for the manipulation objects for each region in which the game terminals are installed, based on received second signals; and         means for, when the first signal has been received, sending to a game terminal that is the transfer source of the first signal a third signal comprising selection assessments for the selected manipulation object for the region in which that game terminal is installed; and     wherein the game terminal displays information indicating selection assessments for these selected manipulation object that is based on the received third signal, during the selection processing of the manipulation objects.

This invention further relates to an information storage medium in which is stored information that can be used by a host computer for sending selection assessments of a plurality of manipulation objects through communications lines to a plurality of game terminals which display the received selection assessments, when the game terminals select a manipulation object from among the plurality of manipulation objects for a game, the information storage medium comprising information for implementing:

means for receiving from each of the game terminals a first signal which is sent out during the process of selecting a manipulation object and a second signal indicating the selected manipulation object which is sent out after the manipulation object has been selected;

means for computing and storing previous selection assessments for the manipulation objects for each region in which the game terminals are installed, based on received second signals; and     means for, when the first signal has been received, sending to a game terminal that is the transfer source of the first signal a third signal comprising selection assessments for the selected manipulation object for the region in which that game terminal is installed.

In a game system or information storage medium in accordance with this invention, the host computer computes and stores selection assessments for the manipulation objects for each region in which the game terminals are installed. For example, the host computer computes and stores selection assessments for a group of game terminals that are installed in Osaka and also computes and stores selection assessments for a group of game terminals that are installed in Tokyo. This means that different selection assessments are provided for each manipulation object in Tokyo and Osaka.

This aspect of the invention therefore makes it possible for the host computer to provide the game terminals in each region with information that reflects the selection assessments in that region, thus making it possible to implement a game that reflects the allegiances of players in each region to different manipulation objects.

In particular, this aspect of the invention makes it possible to compute selection assessments for manipulation object, not in individual game terminal units but in region units, and supply them to the game terminals. Thus the player can select the manipulation object that is the player's own favorite, to enjoy a game therewith, while viewing the selection assessments for the entire region. This makes it possible to provide an interesting game that reflects the allegiances of players in that region.

In this case, communications lines are not limited to wired communications lines such as cables; they could also include satellite communications and wireless communications lines such as in a wireless LAN.

The display of selection assessments could be a display of selection assessments for manipulation objects within all or part of the region, during the selection of manipulation objects.

Furthermore, a configuration could be used in which the display of selection assessments could be a selection assessments of a region that differs from the region in which the player is playing, if necessary. This makes it possible for the player to confirm which team is popular in another region and also makes it possible for the player to select any region then select a selectable manipulation object within that region, to enjoy the game. Thus the player can select and play with the favorite team of the player's home town, where the game abilities thereof are higher, even from a location that differs from that home town, by selecting the favorite team of the region of the player's own home town.

(3) The game system in accordance with this invention may further comprise ability adjustment means for increasing abilities of a manipulation object with a higher selection rate or a manipulation object with a large number of selections.

An information storage medium in accordance with this aspect of the invention is an information storage medium which can be used by a computer and which comprises information (a program) for implementing (executing) the above described means. A program in accordance with this aspect of the invention is a program that can be used by a computer for implementing (executing) the above described means. A program in accordance with this aspect of the invention could also be embodied in a carrier wave.

It is possible to implement a game that reflects the allegiances of the player, by increasing the game abilities of a manipulation object with a high selection rate or a manipulation object with a large number of selections. In other words, the player can get the feeling of manipulating a manipulation object having game abilities that are higher than normal and thus play a game that feels more satisfying, by selecting and playing with a manipulation object that has a high selection rate or a manipulation object that has a large number of selections.

(4) In the game system of the present invention, the selection processing means may comprise:

means for executing processing for displaying information indicating selection assessments for each of the manipulation objects, on the display means; and     means for displaying on the display means information indicating the plurality of selectable manipulation objects, and for executing processing for enabling a player to select any manipulation object.

An information storage medium in accordance with this aspect of the invention is an information storage medium which can be used by a computer and which comprises information (a program) for implementing (executing) the above described means. A program in accordance with this aspect of the invention is a program that can be used by a computer for implementing (executing) the above described means. A program in accordance with this aspect of the invention could also be embodied in a carrier wave.

(5) A game system of this invention comprises:
means for storing information concerning a plurality of manipulation objects that have been allocated to different regions;
means for storing game ability information for the manipulation objects;
means for executing processing for displaying on a display means information indicating manipulation objects that can be selected for use in a game, based on information concerning the plurality of manipulation objects;
means for selecting from the selectable manipulation objects a manipulation object for use in a game;
means for executing game computations to allow a player to play a game using the thus selected manipulation object;
means for computing previous selection assessments for each of the manipulation objects; and
means for executing processing for displaying information indicating selection assessments for each of the manipulation objects, on the display means, when the manipulation object is selected.

In this case, the means for executing the game computations could set the abilities of manipulation objects and execute the game computations on the basis of abilities information within the game of the selected manipulation object.

An information storage medium in accordance with this aspect of the invention is an information storage medium which can be used by a computer and which comprises information (a program) for implementing (executing) the above described means. A program in accordance with this aspect of the invention is a program that can be used by a computer for implementing (executing) the above described means A program in accordance with this aspect of the invention could also be embodied in a carrier wave.

(6) In a game system, information storage medium, and program in accordance with this invention, the selectable manipulation objects may be set as teams or characters that have been allocated to different regions; and the game may be set to be a competitive type of game in which a selected team or character competes against another team or character.

In this case, specific examples of manipulation objects that have been allocated to different regions are baseball or soccer teams sponsored by those regions. Similarly, characters allocated to those areas could be sumo wrestlers or the like, who are from those regions. These are equivalent to sumo wrestlers from Hokkaido and sumo wrestlers from Osaka.

Examples of this competitive type of game are baseball and soccer as competitive games for teams, or sumo as a competitive game for characters.

Use of the above described configuration makes it possible to provide a more interesting game by allowing the player to select a manipulation object that reflects the player's own allegiances towards the manipulation object, when selecting a team or character that is the manipulation object.

In this case, it is possible to implement a game that is extremely satisfying to the players in that it reflects the allegiances of players to the manipulation objects, by using a configuration in which adjustment of the game abilities of manipulation objects is based on the selection assessments of the manipulation objects.

The team or character that is favorite in each region will naturally have a higher selection count. This means that the game abilities of a team or character that is favored in a certain region can be increased by using a configuration in which the game abilities are increased with increasing selection count or selection rate, which represents the selection assessment of each manipulation object. This means that, when the player selects a team for playing the game that is the favorite in the region in which the player lives, the player can select that team after learning that the team that is the player's own favorite is popular, and the player can also get the feeling that the selected team is stronger than other teams, when playing with that team. It is therefore possible to give the player a higher sense of satisfaction.

In addition, if the player plays the game at a game machine or game terminal that is installed in a region that differs from the region in which the player lives, such as when a player from Hiroshima plays in Tokyo, the player can also know that the selection rate of a team from Hiroshima, which is the player's home region, is high from the data indicating the selection assessments that is displayed during team selection. In this case too, it is possible to give the player a large sense of satisfaction with respect to the game.

BEST MODE FOR CARRYING OUT THE INVENTION

Preferred embodiments of this invention are described below with reference to the accompanying drawings. Note that the description below concerns an embodiment in which this invention is applied to a machine that plays a competitive type of baseball game but the present invention is not limited thereto.

Figure 1:
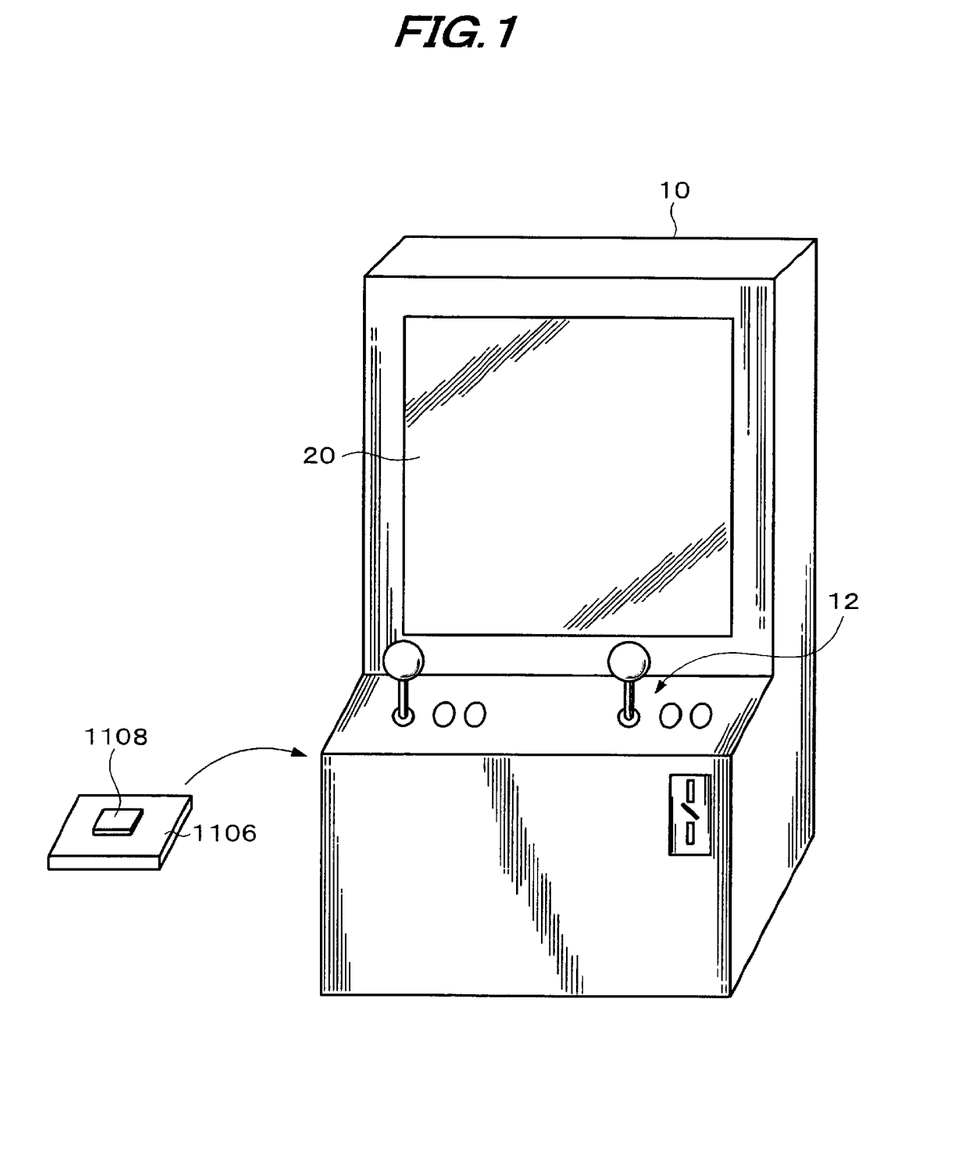
FIG. 1 shows an example of an external view of a game system in accordance with an embodiment of this invention.

An external view of an arcade game machine 10, which is a game system to which this invention is applied, is shown in FIG. 1.

This arcade game machine 10 comprises an operating section 12 to be manipulated by the player and a display section 20 that displays a game screen and other screens.

When a predetermined game fee is inserted through a coin insertion portion of the game machine 10 of this embodiment, an initial screen for selecting any manipulation object from among a plurality of manipulation objects is displayed first, then a game screen for playing a game with the selected manipulation object is displayed.

With this embodiment of the invention, images of a plurality of baseball teams that are sponsored in different regions are displayed on the display section 20 as objects to be selected, and the player uses a joystick or buttons on the operating section 12 to select any baseball team and thus enjoy playing a baseball game against another team.

Figure 5:
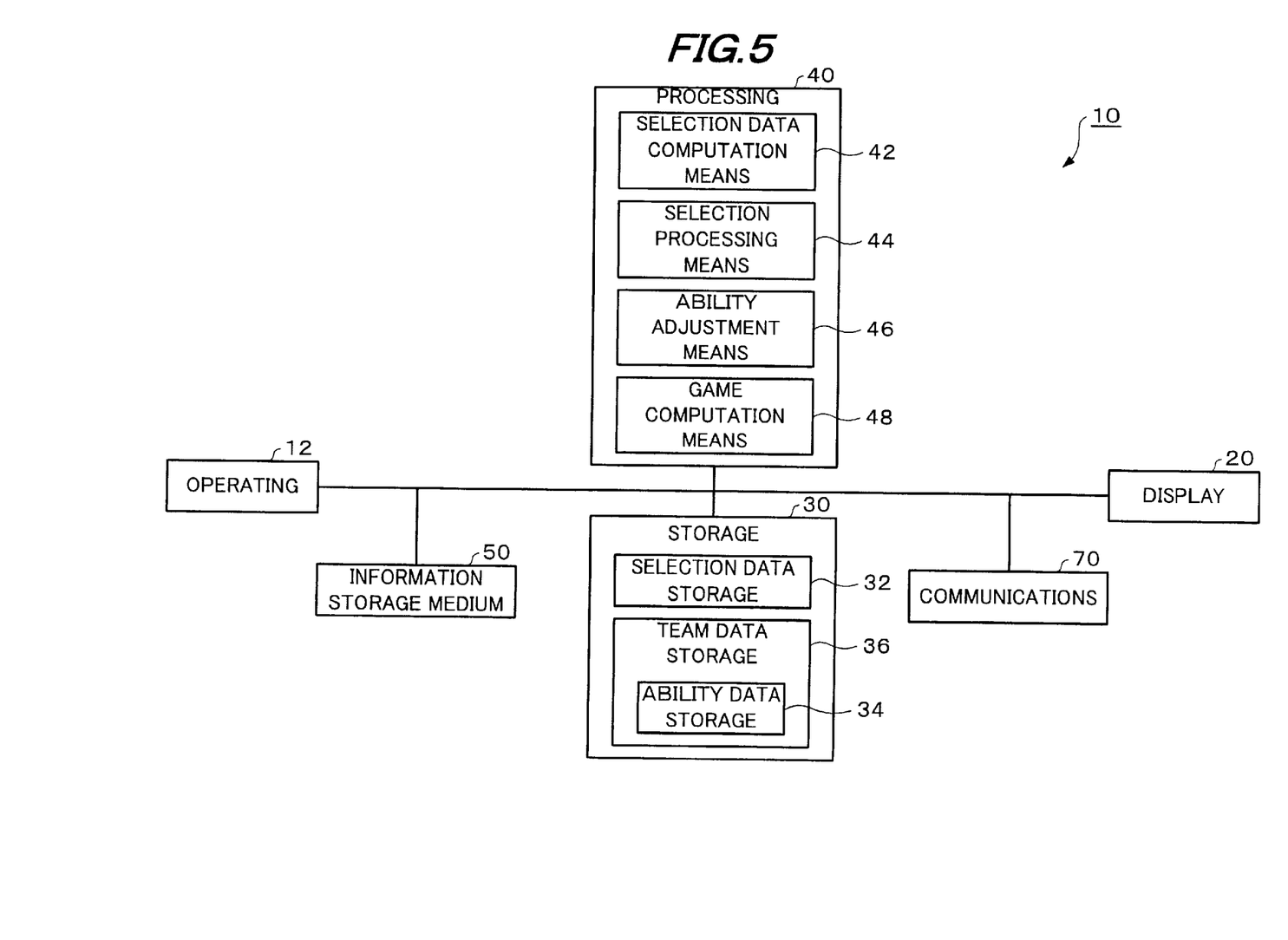
FIG. 5 shows an example of the functional block diagram of the game system of this embodiment.

A schematic functional block diagram of the game machine 10 of this embodiment of the invention is shown in FIG. 5.

The game machine 10 of this embodiment comprises the operating section 12, the display section 20, a storage section 30, a processing section 40 for executing various processes, an information storage medium 50, and a communications section 70.

In this case, the processing section 40 is designed to execute various types of processing, such as controlling the entire system, issuing instructions to the blocks within the system, executing the various computations required for the game, and generating images to be displayed on the display section 20. The functions of this processing section 40 can be implemented by hardware such as a CPU, a DSP, or an ASIC and by a given program (game program or image generation program) and image information.

The operating section 12 allows a player to input manipulation data, where the functions thereof could be implemented by hardware such as levers or buttons, as shown by way of example in FIG. 1.

The storage section 30 is designed to act as a work area for the processing section 40 and other components, where the functions thereof can be implemented by hardware such as RAM.

The information storage medium (a storage medium that makes it possible for information to be read therefrom by a computer) 50 stores information such as a program and data, where the functions thereof can be implemented by hardware such as an optical disk (CD or DVD), a magneto-optical disk (MO), a magnetic disk, a hard disk, magnetic tape, or semiconductor memory (ROM). The processing section 40 executes the various processings of this invention, based on information stored in this information storage medium 50, and it functions as a assessment computation means 42, a selection processing means 44, a ability adjustment means 46, and a game computation means 48 which will be described later.

In other words, the information storage medium 50 contains various types of information (programs and data) for implementing the means of this invention (this embodiment), particularly the blocks in the processing section 40 and the storage section 30.

Note that part or all of the information stored in the information storage medium 50 is transferred to the storage section 30 at a suitable time, such as when the device is switched on. The information stored in the information storage medium 50 comprises at least one of: program coding for implementing the processing of this invention, image information, sound information, shape information for display objects, table data, list data, player information, information for instructing the processing of this invention, and information for executing processing in accordance with those instructions.

The communications section 70 provides various forms of control for executing communications to and from an external device (such as another game machine that is a host machine) where the functions thereof can be implemented by hardware such as a communications ASIC, modem, or CPU and a given program (communications program).

Note that the information used for implementing the processing of this invention (this embodiment) could also be disposed within an information storage medium possessed by a host machine (server) and distributed therefrom through a network and the communications section 70 to the information storage medium 50. The use of such an information storage medium within a host machine (server) is also comprised within the scope of this invention.

The processing section 40 functions as the assessment computation means 42, the selection processing means 44, the ability adjustment means 46, and game computation means 48.

The storage section 30 functions as a storage section that comprises a selection assessments storage section 32 and a team data storage section 36.

Within this team data storage section 36 is stored data on a plurality of selectable professional baseball teams that are sponsored in each area. In particular, this baseball team data is preferably formed on the basis of data on actual professional baseball teams that are sponsored in each region in reality.

More specifically, the data comprises character data for each team, such as character data on nine initial players, "pinch-hitting" members, defense members, other starting members, intermediary and relief pitchers. This character data is prepared beforehand by the manufacturer, based on the data of players who make up actual professional baseball teams.

In addition, data such as abilities data that represents the strengths of each team and abilities data on each baseball player within that team is stored in a ability data storage section 34 within the team data storage section 36. It is therefore possible to adjust the abilities of each team as required, by updating this abilities data stored in the ability data storage section 34.

The previous selection assessments for each baseball team that can be selected are stored for each team in the selection assessments storage section 32. More specifically, selection count C for each team, the total selection count S for all teams, and the selection rate R for each team (which is the selection count C divided by the total selection count S) are stored therein in an updatable manner.

The assessment computation means 42 is activated at game start, so that when the player selects a favorite team, it increments the selection count data C for the selected team and the total selection count S for all teams, and updates the data.

When the player inserts a coin that corresponds to the predetermined game fee for the game machine 10, the selection processing means 44 displays on the display section 20 a plurality of baseball team names and the selection assessments for each team (in this embodiment, the selection rate R), and executes processing to enable the player to select any team.

Figure 2:
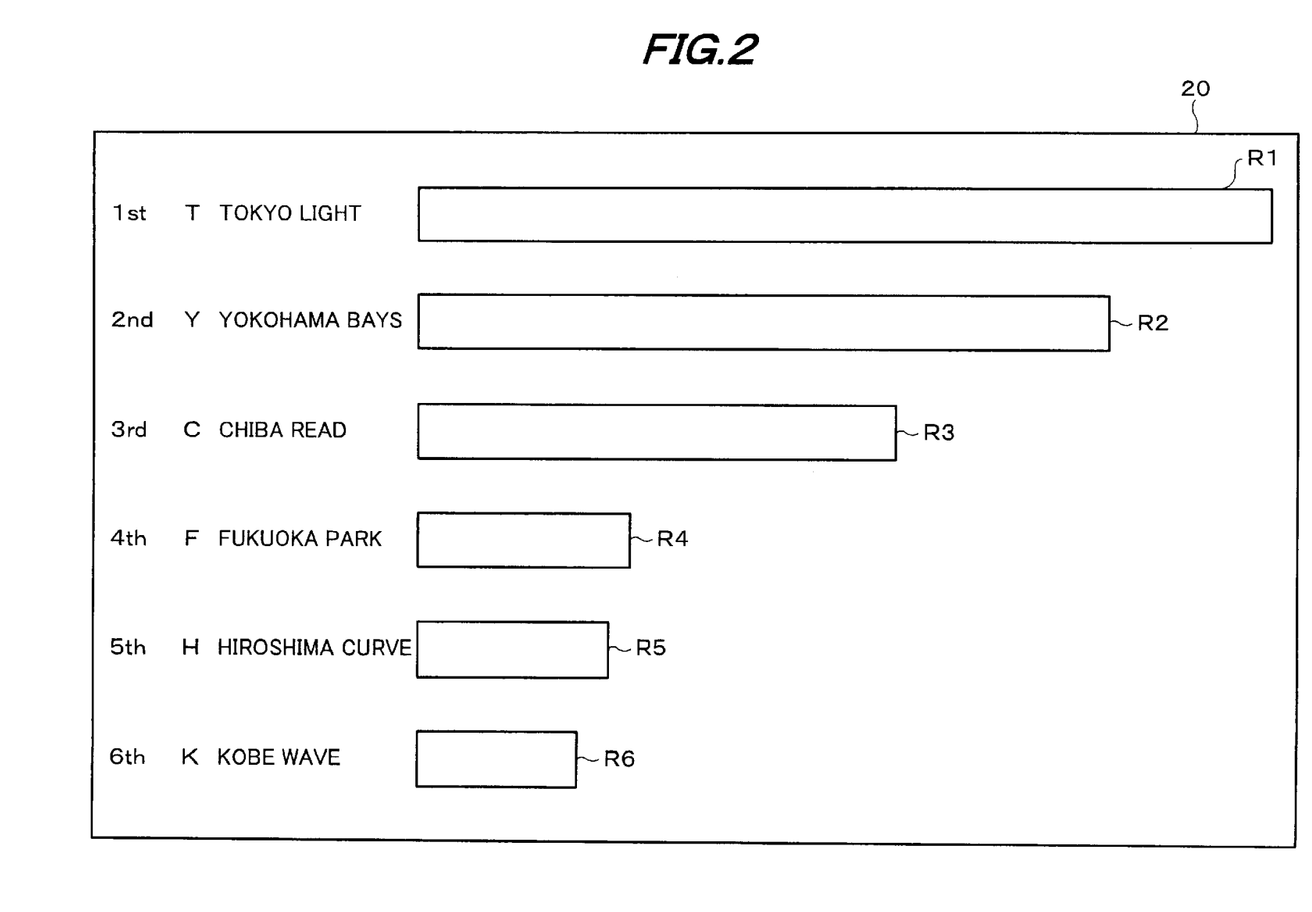
FIG. 2 shows an example of a screen displaying a list of team selection rates.
Figure 3:
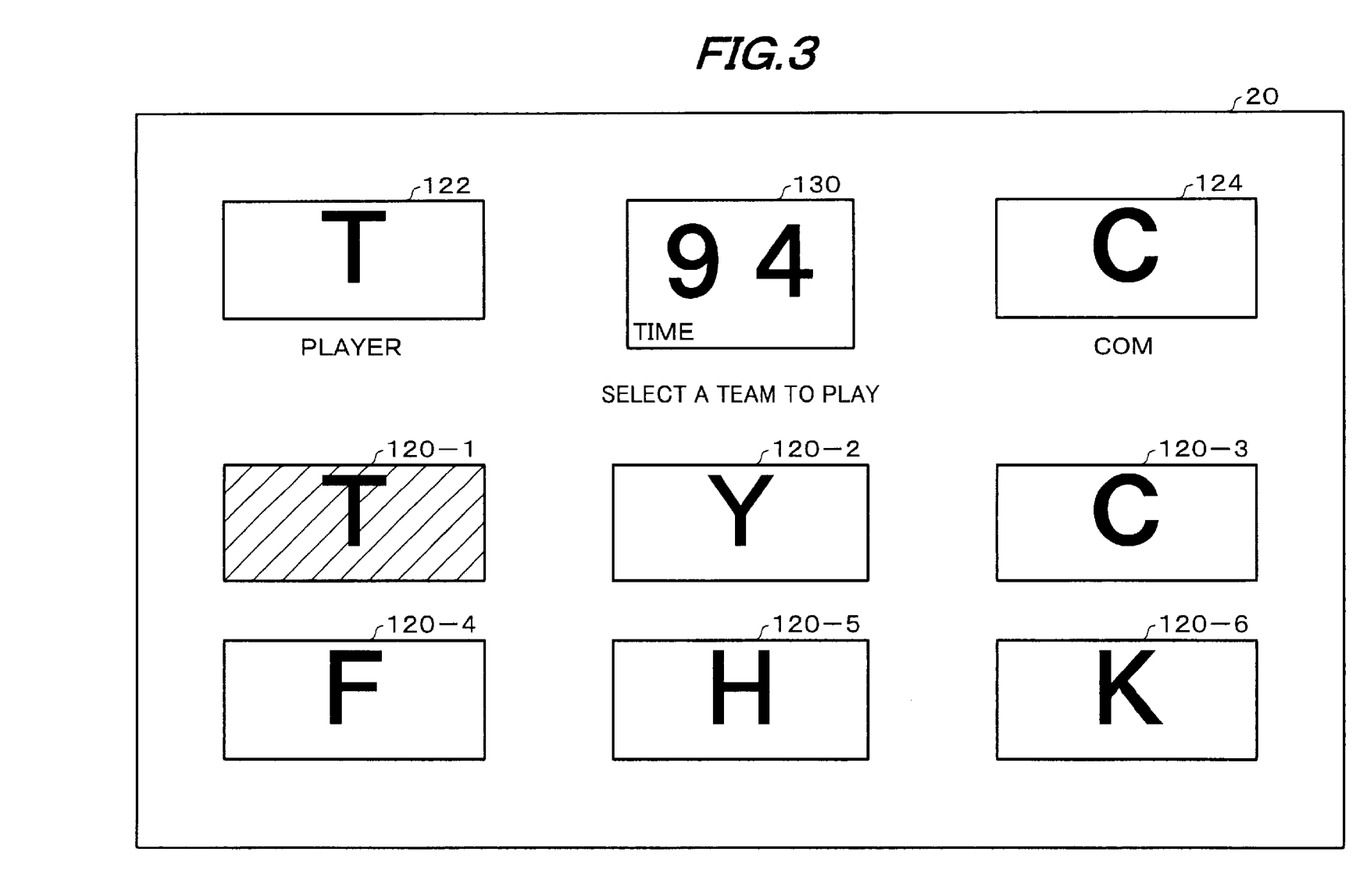
FIG. 3 shows an example of the display screen during team selection.

More specifically, a list of the previous selection rates R of the plurality of baseball teams, an shown in FIG. 2, and a team selection screen as shown in FIG. 3 are displayed on the display section 20 to enable the player to select any team.

In this embodiment of the invention, the screen shown in FIG. 2 is displayed first, then the screen shown in FIG. 3.

Note that if the selection assessments storage section 32 contains only the selection count C for each team and the total selection count S for all teams, the selection processing means 44 may compute the selection rate for each team based on the selection count data C for each team and the total selection count S that are stored in this storage section 32, to display an image as shown in FIG. 2.

The description now turns to the display of the list of team selection rates shown in FIG. 2 and the screen used for selecting a team, as shown in FIG. 3.

The list of team selection rates shown in FIG. 2 displays selection rates R1 to R6 for six teams on the display section 20 for team selection. It is preferable that the teams are displayed in descending order of selection rate or selection count.

The example of FIG. 2 shows a bar chart but the selection assessments can be displayed in other ways, including a direct display such as numerically or as a pie-chart, or an indirect display such that the team with the highest selection rate is displayed larger.

Since the process of computing the selection rate also computes the selection count, a method of displaying the selection assessments could also be used in which the selection count is displayed instead of the selection rate. This would have substantially the same effect.

The team selection screen shown FIG. 3 is displayed immediately after the screen of FIG. 2 is displayed. Selectable teams 120-1 to 120-6 are displayed on the team selection screen. The player operates the operating section 12 within a limited selection time that is displayed on a count-down display section 130 of the screen, to select a favored team. Note that the selection rate display screen of FIG. 2 and the team selection screen of FIG. 3 could equally well be displayed simultaneously.

Thus, when the player comes to pay the predetermined game fee, select a team from among the plurality of baseball teams. and play the game, that baseball team selection becomes valid and the selection rates of the selectable teams up until that point is displayed as an image to the player.

The above described configuration makes it possible for the player to know which team is the most popular at the location at which the game machine 10 is installed, when selecting a baseball team.

As a result, the player can select a team that is popular, or, conversely, a team that is unpopular, and enjoy the baseball game.

In particular, the selectable baseball teams displayed on the display section 20 are those that are sponsored by different regions. This makes it possible for each player to select a baseball team that is sponsored by the player's own home town, and play a game therewith, so that the player can enjoy a strongly regional competitive baseball game.

In such a case, the player could select not only the team to be manipulated by the player, but also the team to play against. Note that the opposing team could also be selected automatically by the computer.

If the player has not selected a home team and an opposing team within a limited time, the computer automatically selects the teams and the game starts.

The ability adjustment means 46 adjusts the ability data of the teams, which is stored in the ability data storage section 34, based on the selection rates or the selection count of the teams, in this case, the data in the ability data storage section 34 is updated in such a manner that the competitive abilities of each team rise as the selection rate rises.

The game computation means 48 executes computations for playing a competitive baseball game between a home team and an enemy team that have been determined as described above, in accordance with inputs from an operating section 12 and a predetermined game program, and displays game screens on the display section 20. The abilities of the enemy and home teams during the game are determined on the basis of the abilities stored in the ability data storage section 34. The abilities of a baseball team that has a high selection rate are set to be high and the abilities of a team that has a low selection rate are set to be low. This ensures that the competitive type of baseball game reflects the thus-set abilities data.

This makes it possible for a player to actively select a favorite team and make that team stronger, giving the player incentive to play the game. It also makes it possible to implement a game system that is frequently used.

Moreover, the player gets the feeling that this favorite team becomes gradually stronger every time the player plays the game, making it possible to implement a more exciting, absorbing game.

Figure 4A:
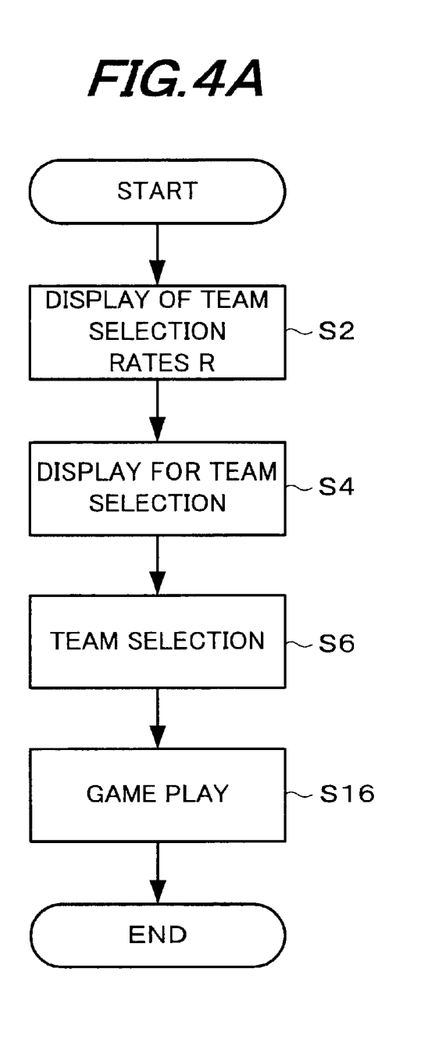
FIG. 4A is a flowchart of the operation of screen display in the game system of this embodiment of the invention and FIG. 4B is a flowchart of the processing for computing and updating the selection assessments.
Figure 4B:
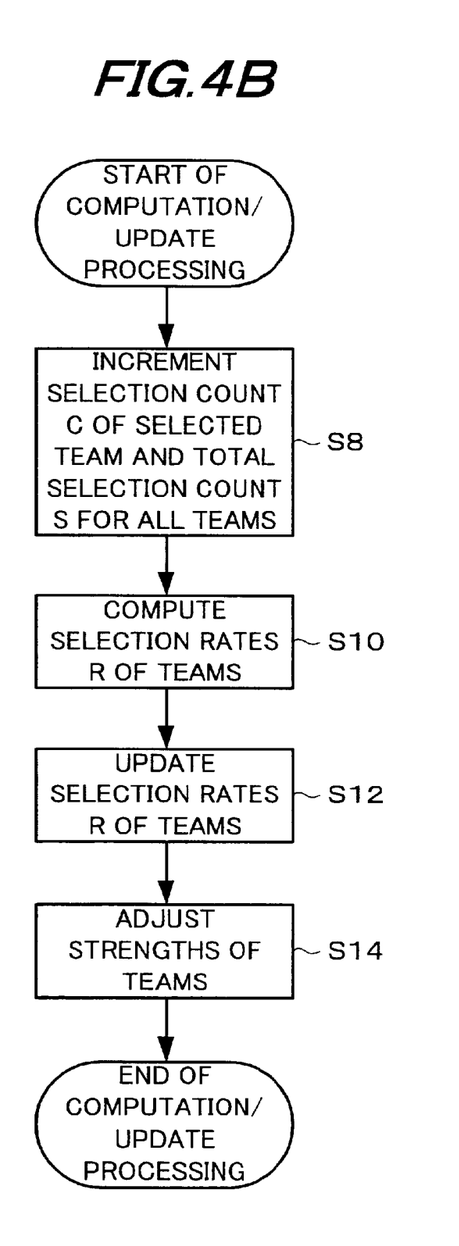

A flowchart of the operation of the game machine 10 of this embodiment of the invention is shown in FIG. 4, where FIG. 4A mainly concentrates on the processing for screen display and FIG. 4B mainly concentrates on the processing for computing and updating the selection assessments.

First of all, after a coin is inserted, the team selection rates R1 to R6 of the teams are displayed on the display section 20 (step 2).

If a player is playing this game in Tokyo, for example, the selection rate of a team that is popular in the Tokyo region will naturally be high. In the screen display shown in FIG. 2, the selection rate R1 of Tokyo Light is the highest.

From this display, the player can get the feeling that Tokyo Light is the most popular team.

Immediately after the screen display of FIG. 2, the team selection screen of FIG. 3 is displayed by the display section 20 (step 4). The player uses the operating section 12 of the game machine 10 to select a favorite team. In this case, the configuration could be such that the screen of FIG. 2 and the screen of FIG. 3 are displayed simultaneously.

If the player selects Tokyo Light 120-1, which is the most popular of the selectable teams 120-1 to 120-6, the mark "T" for Tokyo Light 120-1 is displayed in a selected team display section 122 on the screen (step 6).

The computer team that is the opposing team could be selected by the player or the game machine 10 could select it automatically. In this case, Chiba Read 120-3 is selected and displayed in an opposing team display section 124 on the screen. Note that the updating of the selection assessments of the teams occurs only for the team selected by the player; it does not occur for the team selected by the computer.

The game abilities of a manipulation object that has a higher selection rate are increased to higher than normal. This means that the player can enjoy a game with a manipulation object that has higher game abilities, by selecting an manipulation object that has a high selection rate (step 16).

The description now turns to the processing for computing and updating this selection rate and increasing game abilities of the manipulation objects that have higher selection rates, with reference to FIG. 4B.

When the player selects a team, the selection count C of the selected team and the total selection count S for all teams are incremented (step 8).

More specifically, the assessment computation means 42 increments the selection count C of the selected team and the total selection count S of all teams that are stored in the selection assessments storage section 32, based on a selection signal from the operating section 12.

The assessment computation means 42 then computes the selection rate R for all the teams (step 10). More specifically, the selection rate R1 for Tokyo Light 120-1, which is stored in the selection assessments storage section 32, is obtained as C1/S, based on the selection count C1 of that team and the total selection count S of all the teams, which are stored in the selection assessments storage section 32. In this manner, the selection rates R1 to R6 are computed for all the teams.

After the selection rates R1 to R6 for the teams have been computed, the assessment computation means 42 updates the selection rates R1 to R6 for the teams that are stored in the selection assessments storage section 32 (step 12). This enables the display of new selection rates R1 to R6 for the teams.

The ability adjustment means 46 adjusts the strengths of the teams that are stored in the abilities storage section 34, based on the selection rates R1 to R6 for the teams (step 14).

An example of this strength adjustment is an adjustment that increases the strength of a team with a high selection rate. Taking the baseball game by way of example, various different adjustments are possible, such as making it easier to hit than the batting average on the display, speeding fast balls independent of the defensive ratio on the display, or making a breaking ball curve more sharply.

Note that this computation and update processing could be performed immediately after team selection (step 6), or after the game moves forward (step 16), or after the game ends.

Doing this immediately after team selection (step 6) makes it possible for the changes in abilities to affect the game immediately, based on the team selection of the player. Doing this after the game moves forward (step 16) or after the game ends makes it possible for the changes in abilities to affect the results of the player's team selection during the next time the game is played.

In this manner, it is possible to implement a game that reflects the allegiances of the player, by increasing the game abilities of a manipulation object that has a high selection rate. In other words, the player can get the feeling of manipulating a manipulation object that has game abilities that are higher than normal, by selecting a manipulation object that has a high selection rate and playing the game therewith.

If the game machine 10 is installed in Osaka, for example, the selection rate of a local Osaka baseball team will be higher than that of other teams, reflecting players' allegiances to the local team. This makes it possible for a player to select the local team and play a competitive baseball game after being satisfied by confirming from the team selection screen that the selection rate of the local team is high. When the local team is selected, moreover, the abilities of that team are set to be higher than those of other teams, so that the player can get the feeling that the local team is strong when playing the baseball game in practice, which enables the player to enjoy a highly satisfying baseball game that reflects allegiances in local teams.

Even if this game machine is installed in Tokyo, a player from out of town can select any team for playing the baseball game, after checking the selection rate of the baseball team that is sponsored by the player's own home town. In such a case, the player can enjoy the game with satisfaction even if the baseball team from the player's own home region has a selection rate that is lower of the baseball team of Tokyo, where the game machine is installed, provided that this selection rate is higher than the selection rates of baseball teams of other regions.

Figure 8:
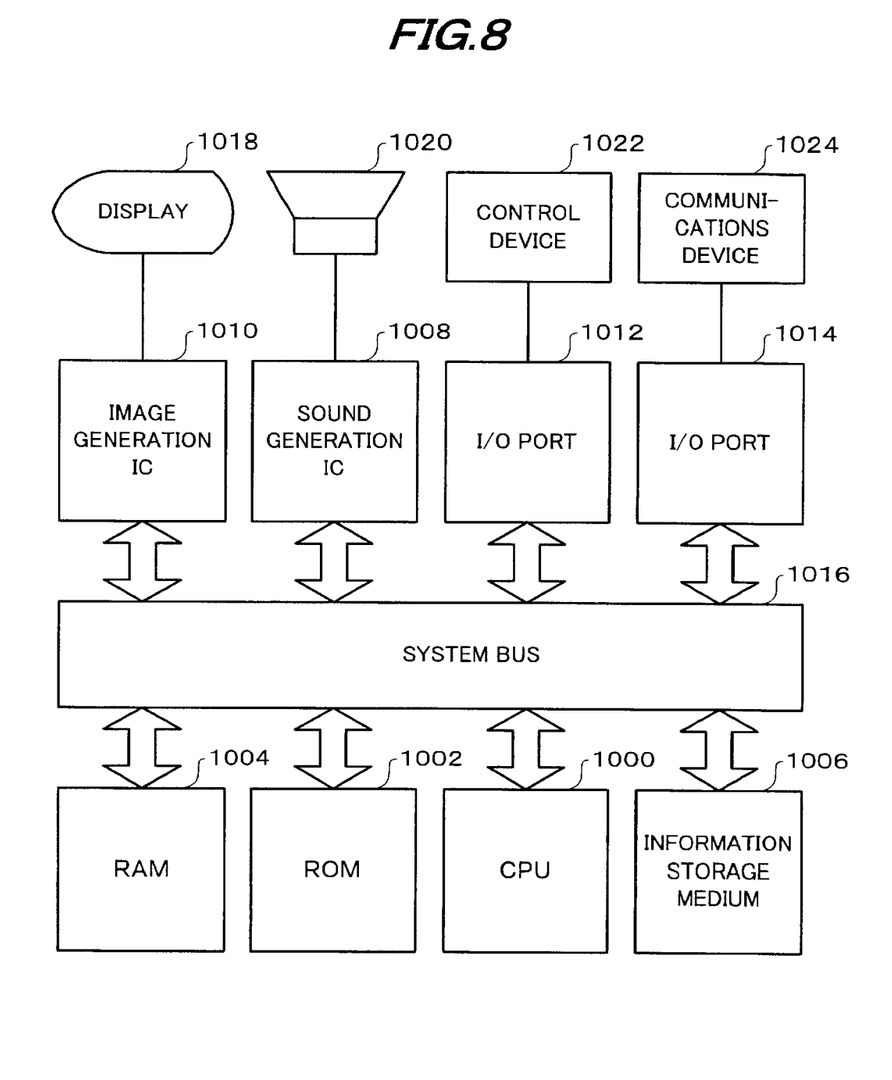
FIG. 8 shows an example of a hardware configuration for implementing this embodiment of the invention.

The description now turns to an example of hardware that can implement this invention, with reference to FIG. 8. In the apparatus shown in this figure, a CPU 1000, ROM 1002, RAM 1004, an information storage medium 1006, a sound generation IC 1008, an image generation IC 1010, and I/O ports 1012 and 1014 are connected together by a system bus 1016 in such a manner that data can be mutually transferred therebetween. A display 1018 is connected to the image generation IC 1010, a speaker 1020 is connected to the sound generation IC 1008, a control device 1022 is connected to the I/0 port 1012, and a communications device 1024 is connected to the I/O port 1014.

The information storage medium 1006 is mainly used for storing program and image data, sound data, or the like for representing display objects. Means such as a DVD, game cassette, or CD-ROM could be used as an information storage medium for storing a game program and other data for a domestic game machine. Alternatively, memory such as ROM could be used for an arcade game machine, in which case the information storage medium 1006 is the ROM 1002.

The control device 1022 is equivalent to a game controller or operating panel and it is used as a device for inputting into the main unit of the device the results of decisions made by the player as the game progresses.

The CPU 1000 controls the entire system and processes data in accordance with the game program stored in the information storage medium 1006, a system program stored in the ROM 1002 (including initialization information for the entire system), and signals input through the control device 1022. The RAM 1004 is a storage means that is used as a work space for the CPU 1000. and specific details from the information storage medium 1006 or the ROM 1002, or the results of computation by the CPU 1000, are stored therein. A data configuration having a logical structure suitable for implementing this embodiment of the invention is constructed within this RAM or information storage medium.

The provision of the sound generation IC 1008 and the image generation IC 1010 in this type of system makes it possible to output game sounds and game images as required. The sound generation IC 1008 is an integrated circuit device that generates game sounds such as sound effects and background music, based on information stored in the information storage medium 1006 or the ROM 1002, and the thus generated game sounds are output by the speaker 1020. The image generation IC 1010 is an integrated circuit device that generates pixel information for output to the display 1018, based on image information that is sent from components such as the RAM 1004, the ROM 1002, and the information storage medium 1006. Note that a device called a head-mounted display (HMD) could also be used as the display 1018.

The communications device 1024 is designed to transfer various types of information used within the game system to and from external devices, and it is used to send given information in accordance with a game program when connected to another game system, or to send information such as a game program over a communications line.

The processing described with reference to FIGS. 1 to 7 is implemented by components such as the information storage medium 1006 that contains a game program and data, the CPU 1000 that operates in accordance with information from the information storage medium 1006, the image generation IC 1010 or the sound generation IC 1008. Note that the processing executed by the image generation IC 1010 and the sound generation IC 1008 could be performed in a software manner by means such as the CPU 1000 or an ordinary DSP.

An example of this embodiment applied to an arcade game machine is shown in FIG. 1. Components such as a CPU, an image generation IC, and a sound generation IC are mounted on an internal system board (circuit board) 1106. Information for executing (implementing) the processing of this embodiment of the invention (means of this invention) is stored in a semiconductor memory 1108, which is the information storage medium on the system board 1106. This information is hereinafter called stored information.

Figure 9A:
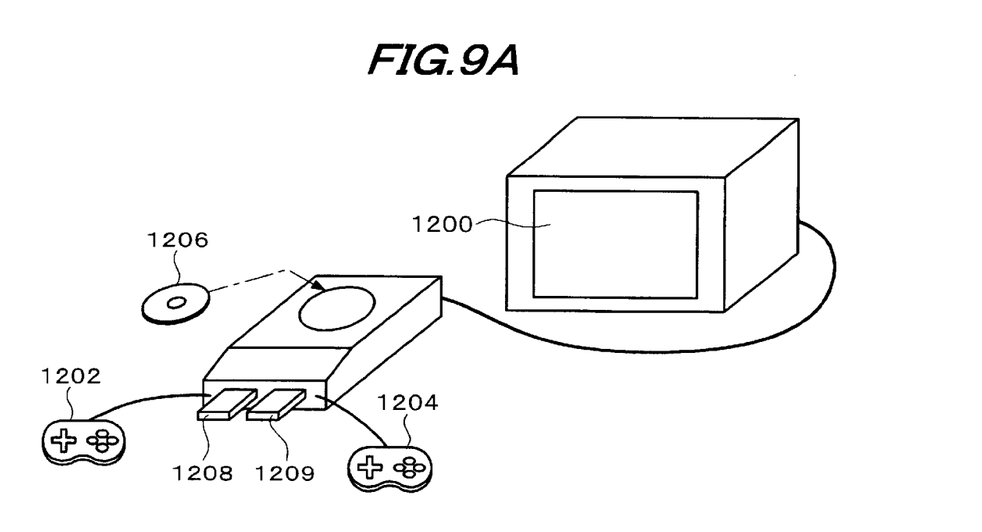
FIGS. 9A and 9B show examples of various types of system to which this invention is applied.

An example of this embodiment of the invention applied to a domestic game system is shown in FIG. 9A. Players enjoy the game by manipulating game controllers 1202 and 1204 while viewing a game image shown on a display 1200. In this case, the above described stored information is stored in a DVD 1206 or memory cards 1208 and 1209, which are information storage media that can be freely inserted into and removed from the main unit of the system.

Figure 9B:
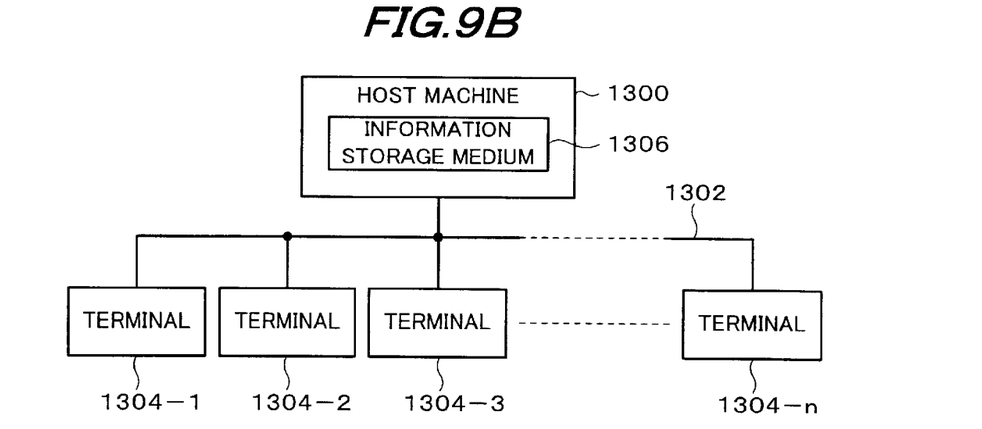

Another example of this embodiment of the invention applied to a game system is shown in FIG. 9B where the game machine comprises a host machine 1300 and terminals 1304-1 to 1304-n connected to the host machine 1300 by communications lines 1302 (a small-scale network such as a LAN, or a wide-ranging network such as the Internet). In this case, the above described stored information is stored in an information storage medium 1306 such as a magnetic disk, magnetic tape, or semiconductor memory that can be controlled by the host machine 1300. If each of the terminals 1304-1 to 1304-n has a CPU, an image generation IC and a sound generation IC, and if game images and sounds can be generated thereby in a stand-alone manner, means such as a game program for generating game images and sounds is transferred to the terminals 1304-1 to 1304-n from the host machine 1300. If, on the-other hand, they cannot be generated in a stand-alone manner, the host machine 1300 creates the game images and sounds then transfers them to the terminals 1304-1 to 1304-n for output by those terminals.

Note that the processing of this invention in the configuration shown in FIG. 9B could also be divided between the host machine (server) and the terminals. Similarly, the above described stored information used for implementing this invention could be divided between an information storage medium on the host machine (server) and information storage media of the terminals.

In addition, the terminals connected by the communications lines could be either domestic game systems or arcade game systems. If arcade game systems are connected by communications lines, it is preferable to use portable information storage devices (memory cards or hand-held game machines) that can exchange information with arcade game systems and also exchange information with domestic game systems.

Note that this invention is not limited to the above described embodiments and thus it can be implemented in various other ways.

Figure 6:
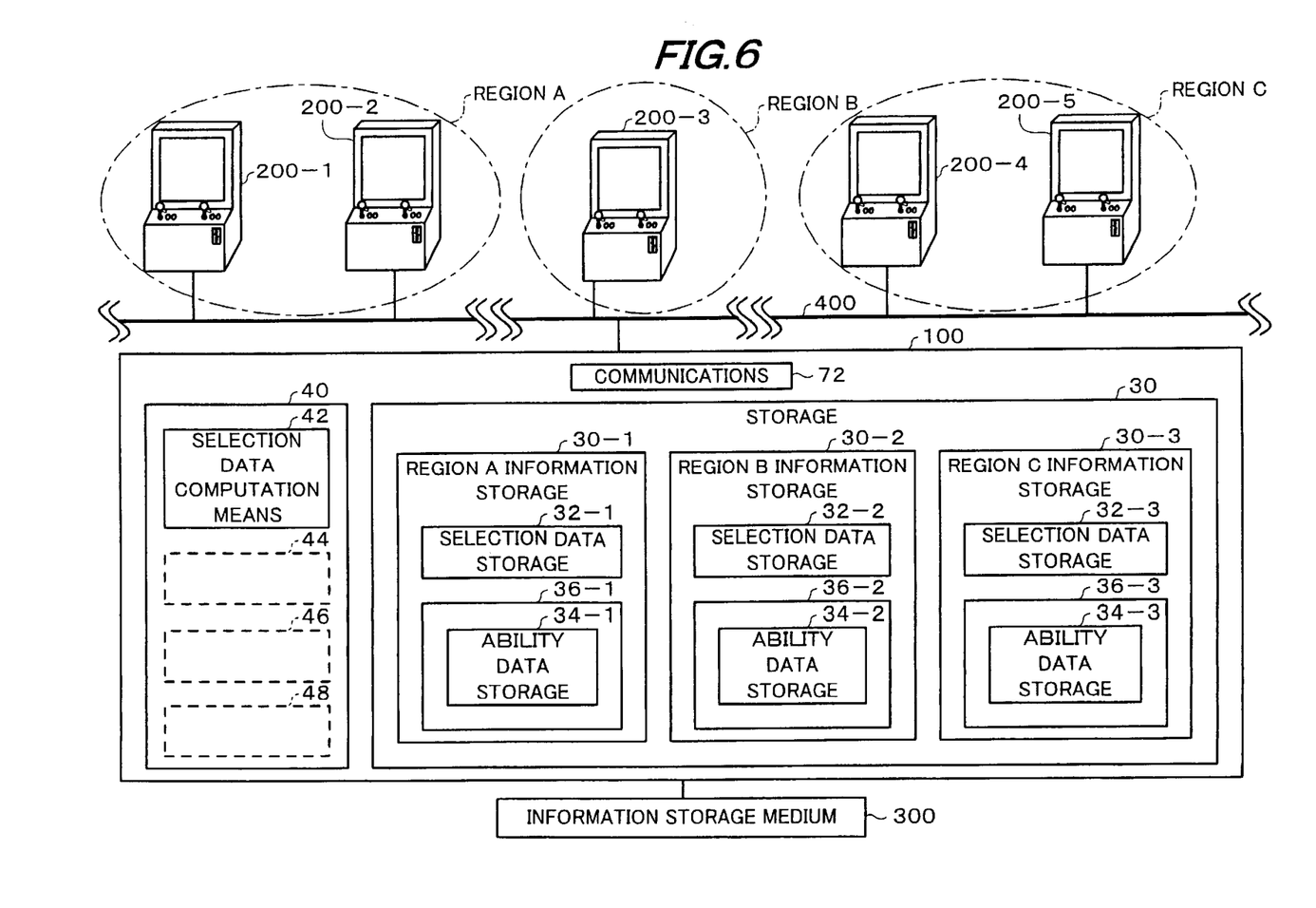
FIG. 6 shows an example of the functional block diagram of a game system of network form.

If the game system is configured of game terminals (domestic game systems or arcade game systems) 200-1 to 200-n connected to a host machine (server) 100 by communications lines 400, as shown in FIG. 6, the structure thereof is preferably as described below.

Assume that the game terminals 200-1 and 200-2 are installed in a region A, the game terminal 200-3 is installed in a region B, and the game terminals 200-4 and 200-5 are installed in a region C, as shown in FIG. 6.

The host machine 100 is provided with a communications section 72, the processing section 40, and the storage section 30.

The communications section 72 exchanges data with the game terminals 200 in different regions, over the communications lines 400.

The storage section 30 comprises region information storage sections 30-1, 30-2, and 30-3, one for each of the regions A, B, and C.

The processing section 40 could function as at least the assessment computation means 42. In addition, it could be configured to implement at least one of the functions of the selection processing means 44, the ability adjustment means 46, and the game computation means 48, if necessary.

Each of the region information storage sections 30-1, 30-2, and 30-3 could also function as the selection assessments storage section 32 that contains the selection assessments of the manipulation objects of the groups of game terminals installed in the corresponding regions. Note that the region information storage sections 30-1, 30-2, and 30-3 could also be configured to function as a storage section 36 containing data on the selectable manipulation objects for each region and the ability data storage section 34 containing the abilities of those selectable manipulation objects, if necessary.

Information that can be read out within the host machine 100 is stored in an information storage medium 300; more specifically, information that enables the host machine 100 to function as the processing section 40, the storage section 30, and the communications section 72 is stored therein.

Details of the game played at each game terminal 200 in the regions are the same as those described with reference to the previous embodiments.

If a manipulation object is selected at one of the game terminals and the game starts, that information is sent from the game terminal 200 to the host machine 100 as a second signal.

The assessment computation means 42 in the host machine 100 receives this second signal through the communications section 72, then increments the selection count C of the manipulation object in the region that is the source of this second signal and the total selection count S of all the manipulation objects, and also computes the selection rate R of all manipulation objects in that region. The data in the selection assessment storage section 32 within the storage section 30 is updated on the basis of these computations.

If the game terminal 200 that is the transfer source of the second signal is in region A, for example, the data within the storage section 32-1 of the information storage section 30-1 for region A is updated as described above.

In a similar manner, if the game terminal that is the transfer source is in region C, data within the selection assessment storage section 32-3 of the region information storage section 30-32 for region C is updated as described above.

In this manner, various items of data representing the selection assessments of manipulation objects (such as the selection count C of each manipulation object, the total selection count S of all manipulation objects in that region, and the selection rates R of these manipulation objects in that region, which is based thereon) are computed for each group of game terminals installed in each region, and this data is divided for storage between the region information storage sections 30-1, 30-2, and 30-3 that are allocated to each region.

A request signal for selection assessments data for the manipulation objects, which precedes the selection processing for the manipulation object, is sent from the game terminal 200-1 as a first signal to the host machine 100.

When this first signal is received by the communications section 72, the host machine 100 determines the region in which the transfer source of the first signal exists, calls selection assessment for the manipulation objects in that region from the selection assessment storage section 32 in which is stored information for that region, then returns that data as a third signal to the game terminal 200 that is the request source, through the communications section 72. In this case, the selection count C for each manipulation object, the total selection count S for all manipulation objects in that region, and the selection rate R for each manipulation object are sent as the third signal which represents selection assessments in the region in which this game terminal 200 is installed.

The game terminal 200 that has received this third signal displays the screens shown in FIGS. 2 and 3 on the display section based on the thus received information, so that the player can select any manipulation object and play the game, in a similar manner to previous embodiments.

As described above, the system in accordance with this embodiment of the invention utilizes a configuration in which election assessment for manipulation objects is not stored in individual game terminals, but it is computed in region units and stored in the host machine 100. This makes it possible to compute the data of selection assessments such as selection rates for the manipulation objects based on data relating to all game terminals that are installed throughout that region, for display on the player's game terminal. For example, the selection rate data for each manipulation object that is displayed on each game terminal 200 as shown in FIG. 2 is therefore a reflection of the consensus of all players in that region.

This makes it possible to implement an interesting game that reflects the allegiances of players towards local teams.

For example, players can play the game at the game terminal 200 installed in Tokyo in the situation that show that the selection rate of Tokyo Light is high, or can play the game at the game terminal 200 installed in Hiroshima in the situation that the selection rate of the Hiroshima Curve is high.

It is also possible to selectively display the selection rates for teams or characters in all or only part of the region, when displaying the previously described selection rates on the game terminals 200 in different regions.

In the network system of this embodiment, the configuration could also be such that the selection assessments data can be displayed selectively on each game terminal 200 for any of regions A to C, when the game starts.

Figure 7:
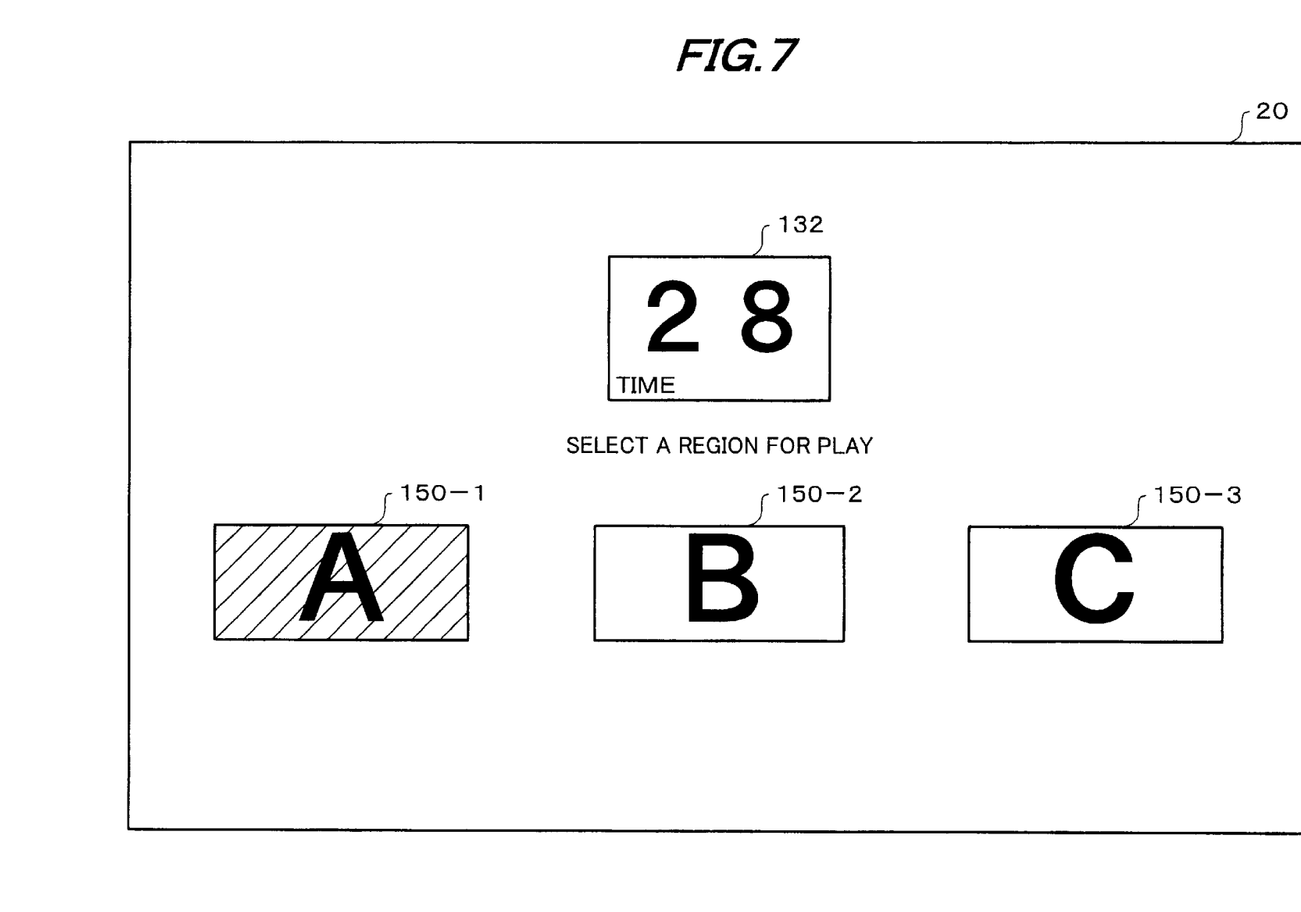
FIG. 7 shows an example of the display screen during region selection in the network game system.

An example of a screen displayed on a game terminal in such a case is shown in FIG. 7.

The display section 20 in each of the game terminals 200-1 to 200-n in the different regions shows a selection time 132 and selectable regions 150-1 to 150-3 for A, B, and C.

If, for example, a player selects selectable region 150-1 that corresponds to region A, the selection rates for teams in region A are displayed on the game terminal 200. This is similar to the situation shown in FIG. 2.

By storing the team selection rates and team abilities for each region in the host machine 100 in this manner, it becomes possible to display the team selection rates for a region selected by the player.

Thus, by having a configuration that allows the player to select a region that is different from the region in which the player is playing, which enables a game that can be played with the same conditions as that on a game terminal 200 installed in that region, it is possible for the player to confirm which is the popular team in another region and also select another region and play the game with the team that is popular in that region.

This makes it possible for a player to select a favorite team from the player's home town, which has increased team abilities, even if the player is in another town.

Assume that a player whose home town is Hiroshima is playing at a game terminal installed in Tokyo, by way of example. In this case, the player selects the Hiroshima region from the region selection screen then selects Hiroshima Curve, which is that town's team. This makes it possible to play the game in the situation that the selection rate for the Hiroshima Curve is increased, even in Tokyo. As a result, the player can play the game with the same feeling as that in the player's home town, even in a region that differs from that home town, thus obtaining a high degree of satisfaction.

If the functions of the selection processing means 44, the ability adjustment means, and the game computation means 48 are not provided on the game terminal 200 side in a network system in accordance with this embodiment of the invention, the host machine 100 side is configured to provide those functions.

If the game terminal 200 does not have the ability adjustment means 46, for example, the processing section 40 of the host machine 100 is configured to function as the ability adjustment means 46. In such a case, the ability adjustment means 46 adjusts data within the ability data storage section 34, which stores the abilities of the manipulation objects for different regions, based on the selection assessments for the regions. If the selection rate for a specific team is high in region A, for example, the data in the ability data storage section 34-1 for region A is updated in such a manner that the abilities of that team are increased. In this case, the data stored in the ability data storage sections 34-2 and 34-3 allocated to other regions is not adjusted. Ability information is sent out to each game terminal in answer to a request from that game terminal.

Note that this invention is not limited to the embodiments described herein and thus it can be modified in various different ways within the scope of the invention.

For example, it is possible to vary not only the abilities of the teams but also the display or sounds in accordance with the selection rate. Taking the baseball game as an example, the screen display and sounds could be varied for each region in such a manner that, if a player is playing the game with the favorite team of the Hiroshima region, wooden rice scoops are displayed and the sound of these rice scoops being hit together is played.

The display of selection screens is also not limited to the above described display before the game starts; it is also possible to display selection screens for further selections during the game.

In addition, the above embodiments were described with reference to an example in which the player selects a baseball team as the manipulation object, but this invention can also be applied to a game in which a soccer team is selected for the game, for example, or in which a type of character other than a team is selected, such as fighters who appear in a hand-to-hand fighting game, or characters that are native to different regions.

This invention is also not limited to arcade and domestic game machines; it can be applied to various other game systems such as large-scale attractions in which many players can participate, simulators, multimedia terminals, and system boards that create game images.

What is claimed is:

1. A game system which permits selection of any manipulation object from a plurality of manipulation objects, to play a game on the game system, said game system comprising:

assessment computation means for computing and storing a previous selection assessment for each manipulation object; and selection processing means for displaying on a display means information indicating said plurality of selectable manipulation objects and information indicating said previous selection assessment for each of said manipulation objects, and for executing processing for enabling a player to select one of said manipulation objects; wherein:

the manipulation objects include teams or characters; and the selection assessments include selection rates or selection counts.

2. The game system as defined in claim 1, further comprising ability adjustment means for adjusting abilities of said manipulation objects, based on selection assessments for said manipulation objects.

3. The game system as defined in claim 1, wherein said selection processing means comprises:

means for executing processing for displaying information indicating selection assessments for each of said manipulation objects, on said display means; and means for displaying on said display means information indicating said plurality of selectable manipulation objects. and for executing processing for enabling a player to select any manipulation object.

4. The game system as defined in claim 1, wherein said selectable manipulation objects are set as teams or characters that have been allocated to different regions; and wherein said game is set to be a competitive type of game in which a selected team or character competes against another team or character.

5. A game system comprising:

means for storing information concerning a plurality of manipulation objects that have been allocated to different regions;

means for storing game ability information for said manipulation objects;

means for executing processing for displaying on a display means information indicating said manipulation objects that can be selected for use in a game, based on information concerning said plurality of manipulation objects;

means for selecting from said selectable manipulation objects a manipulation object for use in the game;

means for executing game computations to allow a player to play the game using the thus selected manipulation object;

means for computing a previous selection assessment for each of said manipulation objects; and means for executing processing for displaying information indicating said previous selection assessment for each of said manipulation objects, on said display means, when said manipulation object is selected; wherein:

the manipulation objects include teams or characters; and the selection assessments include selection rates or selection counts.

6. The game system as defined in claim 5, further comprising ability adjustment means for adjusting abilities of said manipulation objects, based on selection assessments for said manipulation objects.

7. The game system as defined in claim 5, wherein said selectable manipulation objects are set as teams or characters that have been allocated to different regions; and wherein said game is set to be a competitive type of game in which a selected team or character competes against another team or character.

8. A game system in which a host machine and a plurality of game terminals are connected by communications lines, such that each of said game terminals selects a manipulation object from among a plurality of manipulation objects, to play a game on the game system;

wherein each of said game terminals sends a first signal to said host machine during the selection of said manipulation object and sends information concerning said selected manipulation object as a second signal after the selection of said manipulation object;

wherein said host machine comprises:

means for computing and storing previous selection assessments for said manipulation objects for each region in which said game terminals are installed, based on received second signals; and means for, when said first signal has been received, sending to a game terminal that is the transfer source of said first signal a third signal comprising selection assessment for said selected manipulation object for the region in which that game terminal is installed; and wherein said game terminal displays information indicating said selection assessment for said selected manipulation object that is based on said received third signal, during the selection processing of said manipulation objects; wherein:

the manipulation objects include teams or characters; and the selection assessments include selection rates or selection counts.

9. The game system as defined in claim 8, further comprising ability adjustment means for adjusting abilities of said manipulation objects, based on selection assessments for said manipulation objects.

10. The game system as defined in claim 8, wherein said selectable manipulation objects are set as teams or characters that have been allocated to different regions; and wherein said game is set to be a competitive type of game in which a selected team or character competes against another team or character.

11. An information storage medium in which is stored information that can be used by a computer to select any manipulation object from a plurality of manipulation objects, to play a game on the game system, wherein said information comprises information for implementing:

assessment computation means for computing and storing a previous selection assessment for each manipulation object; and selection processing means for displaying on a display means information indicating said plurality of selectable manipulation objects and information indicating said previous selection assessment for each of said manipulation objects, and for executing processing for enabling a player to select one of said manipulation object; wherein:

the manipulation objects include teams or characters; and the selection assessments include selection rates or selection counts.

12. The information storage medium as defined in claim 11, further comprising information for implementing ability adjustment means for adjusting abilities of said manipulation objects, based on selection assessments for said manipulation objects.

13. The information storage medium as defined in claim 11, further comprising information for implementing said selection processing means which comprises:

means for executing processing for displaying information indicating selection assessments for each of said manipulation objects, on said display means; and means for displaying on said display means information indicating said plurality of selectable manipulation objects, and for executing processing for enabling a player to select any manipulation object.

14. The information storage medium as defined in claim 11, wherein said selectable manipulation objects are set as team or characters that have been allocated to different regions; and wherein said game is set to be a competitive type of game in which a selected team or character competes against another team or character.

15. An information storage medium comprising information for implementing:

means for storing information concerning a plurality of manipulation objects that have been allocated to different regions;

means for storing game ability information for said manipulation objects;

means for executing processing for displaying on a display means information indicating said manipulation objects that can be selected for use in a game, based on information concerning said plurality of manipulating objects;

means for selecting from said selectable manipulation objects a manipulation object for use in the game;

means for executing game computations to allow a player to play the game using the thus selected manipulation object;

means for computing a previous selection assessment for each of said manipulation objects; and means for executing processing for displaying information indicating said previous selection assessment for each of said manipulation objects, on said display means, when said manipulation object is selected; wherein:

the manipulation objects include teams or characters; and the selection assessments include selection rates or selection counts.

16. The information storage medium as defined in claim 15, further comprising information for implementing ability adjustment means for adjusting abilities of said manipulation objects, based on selection assessments for said manipulation objects.

17. The information storage medium as defined in claim 15, wherein said selectable manipulation objects are set as teams or characters that have been allocated to different regions; and wherein said game is set to be a competitive type of game in which a selected team or character competes against another team or character.

18. An information storage medium in which is stored information that can be used by a host computer for sending selection assessments of a plurality of manipulation objects through communications lines to a plurality of game terminals which display the received selection assessments, when said game terminals select a manipulation object from among said plurality of manipulation objects for a game, said information storage medium comprising information for implementing:

means for receiving from each of said game terminals a first signal which is sent out during the process of selecting a manipulation object and a second signal indicating the selected manipulation object which is sent out after said manipulation object has been selected;

means for computing and storing previous selection assessments for said manipulation objects for each region in which said game terminals are installed, based on received second signals; and means for, when said first signal has been received, sending to a game terminal that is the transfer source of said first signal a third signal comprising selection assessment for said selection manipulation object for the region in which that game terminal is installed; wherein:

the manipulation objects include teams or characters; and the selection assessments include selection rates or selection counts.

19. The information storage medium as defined in claim 18, wherein said selectable manipulation objects are set as teams or characters that have been allocated to different regions; and wherein said game is set to be a competitive type of game in which a selected team or character competes against another team or character.

* * * * *